United States Patent

Lewis et al.

[11] Patent Number: 5,926,181
[45] Date of Patent: Jul. 20, 1999

[54] METHOD AND APPARATUS FOR IDENTIFYING AND ELIMINATING THREE-DIMENSIONAL OBJECTS VISUALLY OBSTRUCTED FROM A PLANAR SURFACE

[75] Inventors: Michael C. Lewis, Redwood Estates; Stephen L. Morein, San Jose, both of Calif.

[73] Assignee: Stellar Semiconductor, Inc., San Jose, Calif.

[21] Appl. No.: 08/624,261

[22] Filed: Mar. 29, 1996

[51] Int. Cl.[6] ................................................ G06T 15/40
[52] U.S. Cl. ............................................ 345/421; 345/422
[58] Field of Search ................................... 395/121, 122, 395/123; 345/421, 422, 423

[56] References Cited

U.S. PATENT DOCUMENTS

| | | | |
|---|---|---|---|
| 4,945,500 | 7/1990 | Deering | 364/522 |
| 5,345,541 | 9/1994 | Kelley et al. | 395/126 |
| 5,509,110 | 4/1996 | Latham | 395/121 |
| 5,574,835 | 11/1996 | Duluk, Jr. et al. | 395/121 |
| 5,579,455 | 11/1996 | Greene et al. | 395/122 |
| 5,596,686 | 1/1997 | Duluk, Jr. et al. | 395/122 |

*Primary Examiner*—Mark K. Zimmerman
*Attorney, Agent, or Firm*—Sawyer & Associates

[57] ABSTRACT

A method and system for generating a graphical display from data describing at least one three-dimensional object is disclosed. The method and system include determining if a current position intersects a portion of the at least one three-dimensional object. The method and system further include identifying if the portion of the at least one three-dimensional object is visually obstructed and removing data relating to the portion of the at least one three-dimensional object if the portion is obstructed in response to the determination if the current position intersects the portion and without determining a precise axial position of the portion of the at least one three-dimensional object. The method and system also include providing information relating to a plurality of characteristics of the portion if the portion is not obstructed and data relating to the portion is not removed and utilizing information relating to the portion of the at least one three-dimensional object to display an image of an unobstructed portion of the three-dimensional object.

7 Claims, 5 Drawing Sheets

METHOD AND APPARATUS FOR IDENTIFYING AND ELIMINATING THREE-DIMENSIONAL OBJECTS VISUALLY OBSTRUCTED FROM A PLANAR SURFACE

FIELD OF THE INVENTION

This invention relates generally to computer systems with graphics processors, and more particularly to a method and apparatus for identifying and eliminating three-dimensional obstructed objects from a screen image.

BACKGROUND OF THE INVENTION

In conventional computer systems, images are displayed on a two-dimensional screen. The images are defined by arrays of pixels which are either stored in computer memory or received from sources connected to the computer system.

Many images of physical objects may be defined three-dimensionally and may be stored or received as three-dimensional arrays. In recent years, efforts have been undertaken to utilize three-dimensional data to create screen images, also referred to as virtual reality images, that give the illusion of depth. One of the problems associated with production of virtual reality images is determining what objects or portions of objects are within a field of vision seen by a user. For instance, the screen may be considered to be a window or doorway and the user may be considered an observer looking through the window or doorway into a room or outside. The images displayed on the screen represent the images within the field of vision of the observer. In order to produce a field of vision image on a two-dimensional display screen, an efficient method and apparatus for coordinating the use of array elements the physical registers is needed.

SUMMARY OF THE INVENTION

In accordance with the present invention, there is provided a method and apparatus for identifying and eliminating image data of three-dimensional objects obstructed from a two-dimensional view or screen image by determining the visibility of image data utilized to develop a two-dimensional image. The method causes data describing three-dimensional objects within an x-y planar window which is segmented into geometric shapes to be evaluated to determine sets of geometric shapes which include coordinates x,y coinciding with screen pixel (x,y) and to determine which of the geometric shapes is nearest to screen pixel (x,y).

The data processing system, which includes the present invention, includes an image generating unit which processes image data stored in memory. The image generating unit generates a screen image pixel set utilized to produce a screen image from three-dimensional data. The image generating unit includes a three-dimensional obstructed object identifier/removal unit and image generating software. The obstructed object identifier/removal unit identifies data describing objects associated with respective pixels and determines data that describe objects obstructed from a view. The image generating software is accessed by processor and utilizes the information from the identifier/removal unit to generate a data set for producing a display screen image.

Figure 1:
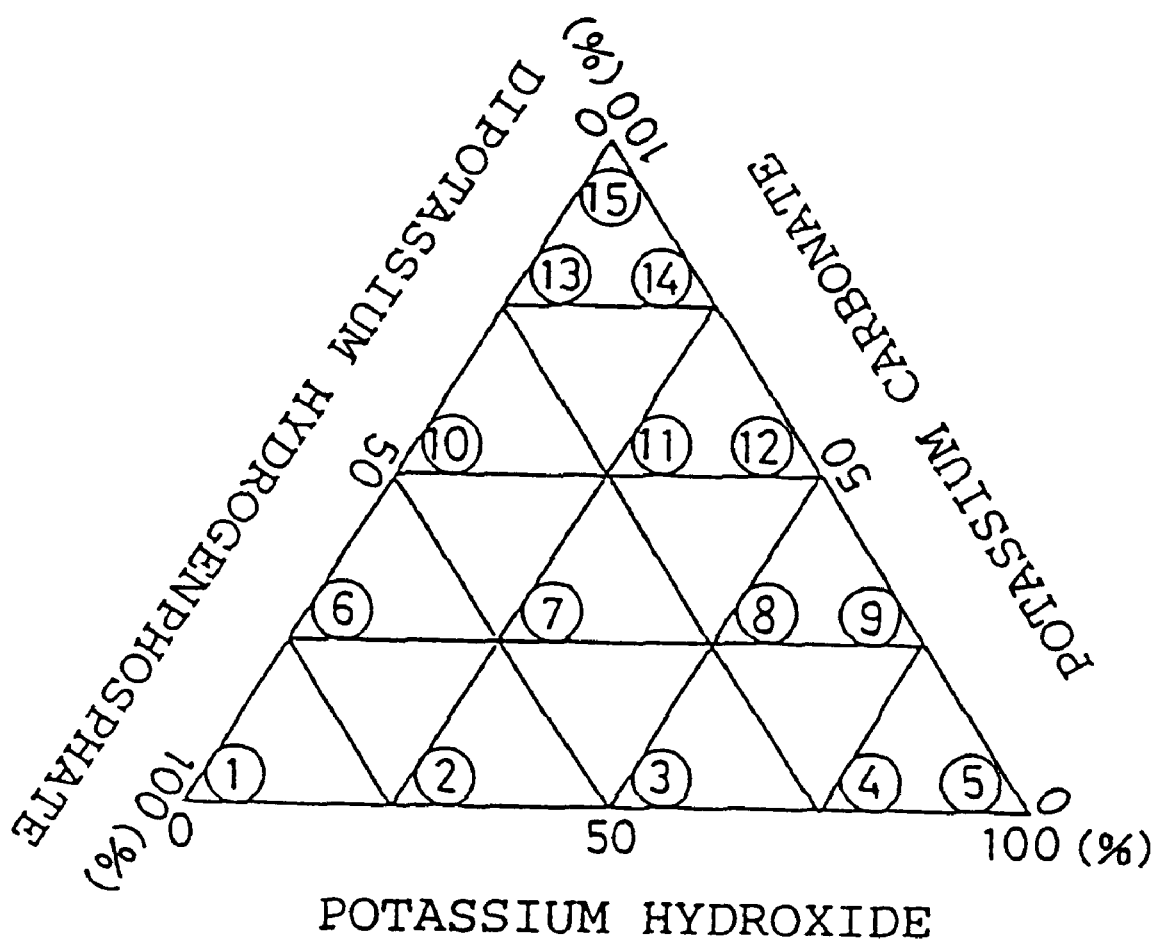
FIG. 1 is a block diagram of a computer system including an image generating unit according to the present invention.

Like reference numerals refer to corresponding components throughout the several diagrams. The most significant digit of each reference numeral corresponds to the figure number wherein the reference numeral first appears and the associated component identified. Reference numerals which appear in parentheses ( ) refer to process steps.

DETAILED DESCRIPTION OF THE PREFERRED EMBODIMENTS

With reference to FIG. 1, there is shown a block diagram representation of a computer 101 wherein the present invention is implemented. Computer 101, a conventional X86 (such as the four hundred series) or Pentium IBM-compatible personal computer or a MacIntosh personal computer or an image graphics engine, includes an image generating unit 103 which generates a screen image pixel set utilized to produce a screen image giving the illusion of depth or three dimensions, otherwise referred to as a virtual reality image, on conventional, two dimensional display screen 105. Image generating unit 103 is implemented with a three-dimensional obstructed object identifier/removal unit and image generating software stored in conventional memory 107 and accessed by conventional processor 109. User interface 110, such as keyboard, mouse, phone line, or other communicating devices, connects to processor 109, memory 107, and image generating unit 103 and enables a user to communicate instructions and data.

A user initiates a graphics processing operation by instructing processor 109 to run an application. An application is accessed by processor 109 from memory 107. As the application executes processor 109 is instructed to fetch data describing three-dimensional objects within an image frame. Processor 109 segments the data into geometric shape and parameter data which respectively describe portions of surfaces of the objects and characteristics, such as color, illumination, and texture. Processor 109 transmits the segmented data to image generating unit 103 through the system bus into bus interface 123. Bus interface 123 transmits the segmented data to data manager 121 which transmits the segmented data to retrievable memory locations in memory 119 for temporary storage. Data manager 121, labeled Poly Manager 121 in FIG. 1, identifies associated data which is stored so that associated geometric and parameter data may later be retrieved. Loader 117 accesses the geometric and parameter data from memory 119 and loads the data into processor block 111 and interpolator 115. Processor block 111 identifies geometric data describing surfaces intersecting a z-axis extending from a selected pixel location in an x-y plane corresponding to a screen of display 105. Three-dimensional obstructed object identifier/removal unit 113, labeled QZ 113 in FIG. 1 receives geometric data associated with the selected pixel and identifies and removes geometric data describing obstructed surfaces. Interpolator 115 receives remaining geometric data from unit 113, interpolates the precise unobstructed point on a surface described by the geometric data, utilizes the parameter data to produce screen pixel data, and transmits the screen pixel data to display 105 through bus interface 123 and the system bus.

Display 105 displays an image according to a set of screen pixel data produced in accordance with the above-described steps.

Figure 2:
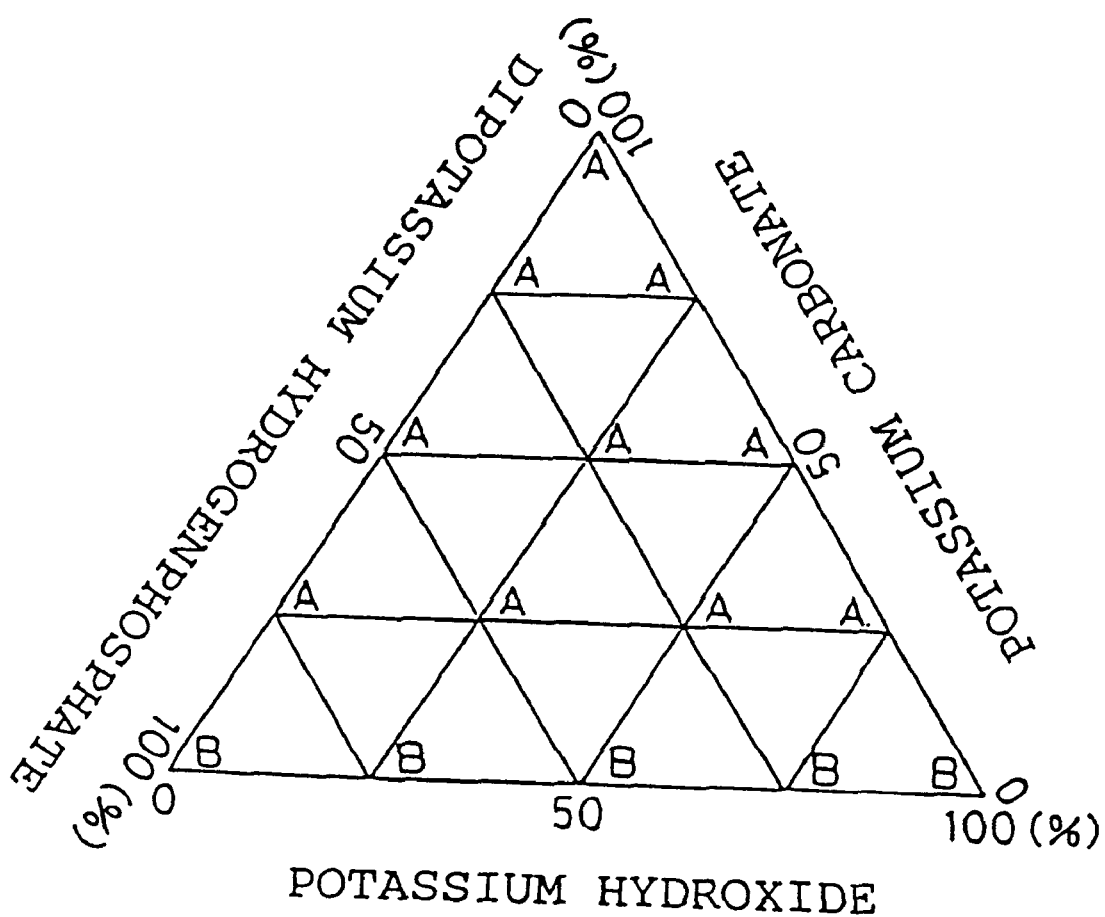
FIG. 2 is a block diagram of a three-dimensional obstructed object identifier/removal unit implemented within the image generating unit of FIG. 1.

With reference to FIG. 2, there is shown a block diagram of three-dimensional obstructed object identifier/removal (quick-z) unit 201 which utilizes a relational algorithm to quickly evaluate the relation of objects within three-dimensional space that are stored in memory 107, identify objects or portions thereof that would be obstructed from view by an observer located at display screen 105, and remove those obstructed objects or portions thereof from consideration during construction of a screen image to be shown by display 105. The relational algorithm does not require exact distance or z-values to be determined, but rather uses inequality logic to reduce image data utilized in the construction of screen images. Identifier/removal unit 201 includes identification/removal logic that is incorporated with two-dimensional screen image generating software operated by computer 101 or may be implemented as a separate computer program operated by computer 101 prior to utilization of conventional two-dimensional screen image generating software.

Identifier/removal unit 201 respectively receives (203) front-z and back-z image data read by processor 109 from memory 107 into conventional first-in first-out input buffer 205 and back-z memory 207. Input buffer 205 transmits (209) the front-z image data to front-z memory 211 and conventionally constructed delay unit 213. Back-z and front-z memories 207, 209 may be conventionally constructed with static or dynamic random access memories (ram) or other conventional memory technology. Back-z and front-z memories 207, 211 may be implemented conventionally as dual port memories respectively including a write port for loading updated data and a read port for accessing stored data. Alternatively, back-z and front-z memories 207, 211 may be conventionally implemented as single port memories operated by processor block 111 with control logic circuitry to respectively load updated data and access stored data over a single read/write port.

Processor block 111 writes the front-z image data transmitted to front-z memory 211 into retrievable memory locations. Subsequently, selected portions of the stored front-z image data transferred or written into compare/remove unit 217. Delay unit 213 receives the same front-z image data as front-z memory 211 and transmits (219) the image data after a pre-determined delay to compare/remove unit 217. The predetermined delay is conventionally determined and designed so that the delayed image data arrives at compare/remove unit 217 in parallel with the read image data from front-z memory 211.

Updated z-values may be loaded into back-z and front-z memories 207, 211 through z-value load (zld) bus from processor block 111.

In parallel with the front-z image data processing, back-z image data from back-z memory 207 is transferred into back-z find unit 223. Back-z find unit 223 receives and compares a set of back-z image data to determine the back-z image data nearest to display screen 105. After evaluation, back-z find unit 223 transmits (225) the nearest back-z image data to conventional first-in first-out back-z buffer 227. Back-z buffer 227 transmits (229) the nearest back-z image data to compare and remove unit 217. Compare/remove unit 217 compares the nearest back-z image data with the front-z image data and categorizes the image data as obstructed or unobstructed. The obstructed data is discarded after evaluation. In turn, compare/remove unit 217 transmits the categorized image data for processing with two-dimensional screen image generating software. Obstructed image data may be discarded and only unobstructed image data transmitted by compare/remove unit 217 to the interpolator for processing with conventional two-dimensional screen image generating software.

Prior to transfer into identification/removal unit 201, image data stored in memory 107 and describing three-dimensional objects within a scene to be shown on display screen 105 is identified by processor 109 using conventionally produced search software. The image data describing respective of three-dimensional objects within the scene is segmented into retrievable blocks of data that describe geometric shapes, which may be characterized as building blocks used to assemble the three-dimensional objects. The geometric shape segments may be defined by a minimal number of coordinate points in the x, y, z directions, where the x-direction is defined as the horizontal direction of display screen 105, the y-direction is defined as the vertical direction of display screen 105, the z-direction is defined as the direction perpendicular to the x-y plane. For instance, the geometric shape segments may be selected as triangles which are defined by three vertices stored in memory 107 or developed by processor 109 from other formatted data describing the three-dimensional objects. Those geometric shape segments which intersect the z-axis extending from respective of the screen pixels (x,y) are identified and stored in memory 107 by object identification software operated by processor 109. For each screen pixel (x,y), an array (list) identifying the geometric shapes which intersect the z-axis extending through the x-y coordinate is produced by geometric shape identification software operated by processor 109.

Associated with each of the three-dimensional objects within the scene, the object identification logic operated by processor block 111 produces a list of tokens, also known as fraglets or identification numbers, which incorporate the back-z and front-z lists. The tokens identify those geometric shapes which include pixels with x,y values within the x-y border of display screen 105. Each token comprises a string of bits of data associated with a respective geometric shape which are partitionable in fields. The fields include a token identification field for identifying the type of token, an image identifier field for identifying a three-dimensional x,y,z array of image pixels stored in memory 107 that contain pixels corresponding to the (x,y) coordinates of display screen 105, a furthest z-field identifier field for identifying an image pixel (x,y,z) having a z-value corresponding to an (x,y) screen pixel which is furthest away from display screen 105 than any other image pixel (x,y,z) of the respective geometric shape, and a nearest z-field identifier field for identifying an image pixel (x,y,z) having a z-value corresponding to an (x,y) screen pixel which is nearest to display screen 105 than any other image pixel (x,y,z) of the respective geometric shape. Alternatively, tokens may include the actual image pixel data rather than indexing a location in memory 107 containing that information.

Four types of tokens are produced: valid, last valid, last not valid, and not valid. Valid and last valid tokens contain indices that refer to the respective related geometric shapes with pixels (x,y,z) which lie on the z-axis of a selected x,y screen pixel and may be visible or contribute to the color of the selected x,y screen pixel. Last valid tokens also indicate that there are no more indices for the selected x,y screen pixel. Last not valid tokens indicate that there are no geometric shapes with pixels on the z-axis of the selected x,y screen pixel. Not valid tokens indicate that there are no geometric shapes identified during a given clock cycle.

With further reference to FIG. 2 and identification/removal unit 201, tokens carrying back-z and front-z image data are read into back-z memory 207 and input buffer 205, respectively. Back-z find unit 223 receives and compares back-z values of the respective intersecting geometric shapes associated with each image pixel. Based upon the comparison, back-z find unit 223 identifies the frontmost back-z value for each image pixel and transmits the frontmost back-z value to back-z buffer 227, where the frontmost back-z value is defined as the nearest back-z value with respect to the x-y plane of display screen 105. During the comparison by back-z find unit 223, input front-z buffer 205 stacks the corresponding front-z tokens associated with the respective image pixel. Once the frontmost back-z value is identified and transferred to back-z buffer 227, the front-z tokens are transmitted by input buffer 205 to front-z memory 211 and delay unit 213. The front-z values for the respective pixel are sequentially read from front-z memory 211 and transmitted along with the front-z token from delay unit 227 to compare/remove unit 217 until no further front-z values associated with a respective image pixel are found. Compare/remove unit 217 compares the front-z values with the foremost back-z value associated with each pixel to determine whether the front-z values are further away from the x-y plane of display screen 105 than the foremost back-z value. If so, compare/remove unit 217 changes the token types to notvalid. If the front-z value is closer or equal to the foremost back-z value, then the token type is output as valid.

During normal operation, only one token type is output as valid from compare/remove unit 217, however in the case where more than one valid token is output for a particular screen pixel, then the actual z-values must be determined in order to determine the valid token for a particular screen pixel. In the case where transparent geometric shapes exist, the back-z values of the transparent geometric shapes are identified as furthest away from the x-y display screen plane so that geometric shapes that are actually further away are not token typed as invalid. In the case when a front-z value cannot be determined in advance for a specific geometric shape, the front-z value is set to the closest z-value associated with the respective screen pixel.

In the case when anti-aliasing occurs or each identified screen pixel actually represents several screen pixels or the intersection of the z-axis and a geometric shape edge are complete, the method may be modified to utilize the partial coverage to determine color and to improve image quality. For such cases, a flag field may be added to tokens which, when set, indicates partial coverage and instructs back-z find unit 223 to replace the back-z value that was selected by a farthest away z-value.

Figure 3:
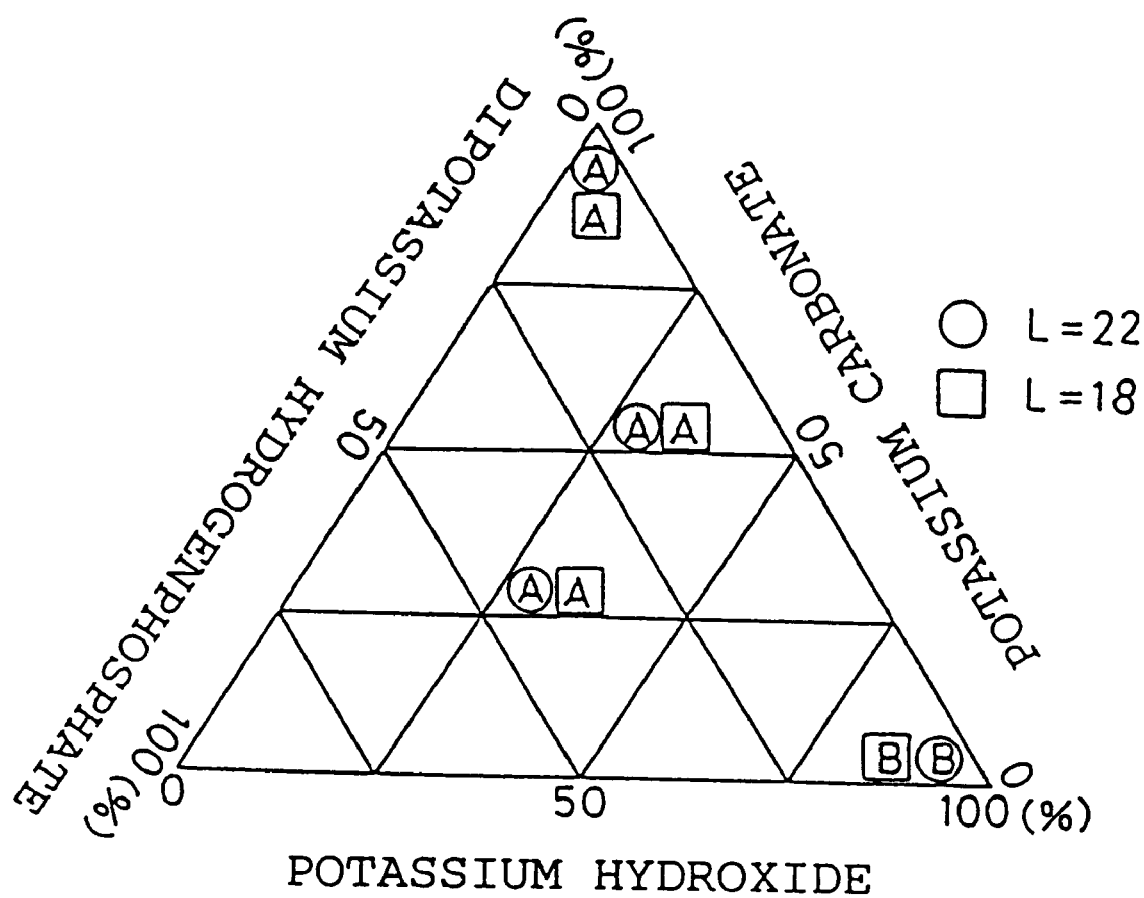
FIG. 3 is a block diagram representation of the back-z find unit implemented within the identifier/removal unit of FIG. 2.

With reference to FIG. 3, back-z find unit 223 is shown which serially receives back-z values through input register 303 from back-z memory 207 and determines the frontmost back-z value for each set of back-z values associated with each screen pixel. The initial back-z value of a set of back-z values is transferred through input register 303 and multiplexer 305 for temporary storage in output register 307. Each of the remaining members of the set are sequentially received into input register 303 during subsequent clock cycles of processor 109. The back-z values stored in input and output registers 303, 305 are transferred to multiplexer 305 and magnitude comparator 309 over respective buses 311, 313. Magnitude comparator 309 evaluates which of the two back-z values are nearer to the x-y display screen plane and transmits a signal over bus 315 to multiplexer 305 to release the frontmost of the two back-z values for storage in output register 307. The process is repeated until each of the members of the set have been compared and the frontmost back-z value acquired. Once the frontmost back-z value has been determined for a set, back-z find unit 223 transfers the frontmost back-z value to back-z buffer 227.

Figure 4:
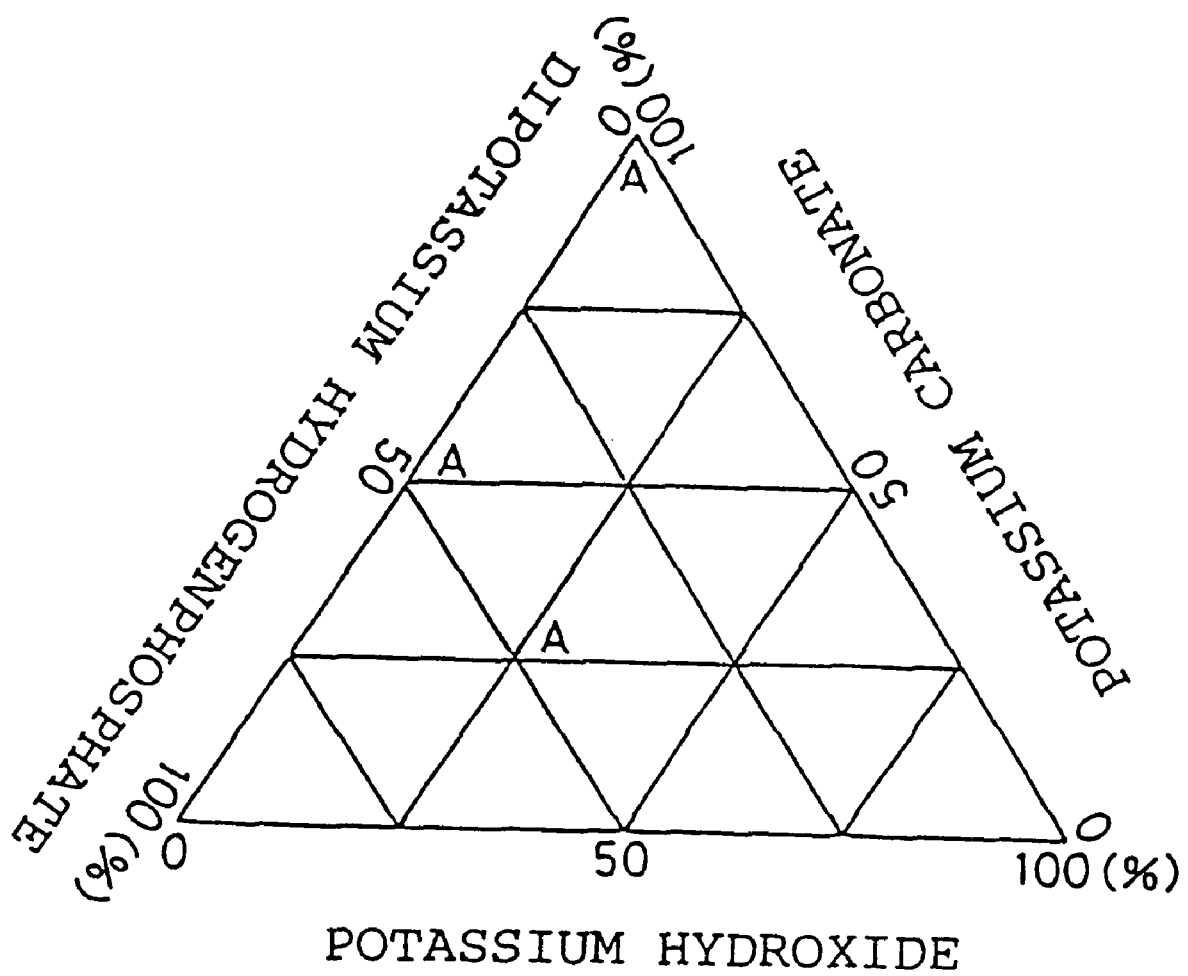
FIG. 4 is a block diagram representation of the compare/remove unit implemented within the identifier/removal unit of FIG. 2.

With reference to FIG. 4, compare/remove unit 217 is shown which determines unobstructed and obstructed geometric shapes by comparing the frontmost back-z value with the front-z values for each screen pixel. Compare/remove unit 217 includes frontmost back-z value input register 403 which receives and temporarily stores the frontmost back-z value from back-z buffer 227, front-z value input register 405 which receives and temporarily stores each of a set of front-z values associated with the screen pixel, and, front-z token input register 407 which receives and temporarily stores each of a set of front-z tokens corresponding to the set of front-z values. The frontmost back-z value and the front-z value are transferred to magnitude comparator 409 from respective registers 403, 405, while the respective token is transferred to output register 411. Magnitude comparator 409 determines whether the front-z value is nearer to x-y display plane than the frontmost back-z value. If so, then a valid signal is transferred from magnitude comparator 409 to cells of output register 411 corresponding to the token type field. The valid signal reads over the token type data stored in output register 411. If the front-z value is not nearer than frontmost back-z then the geometric shape corresponding to the respective front-z value is obstructed from view and thus discarded and magnitude comparator transmits an invalid signal to the cells of output register 411 associated with the token type field of the respective token. Following the transmission of the token type signal, the token is transferred to an interpolator or directly to temporary storage for processing by two-dimensional screen image generation software. The process of compare/remove unit 217 continues until each of the set of front-z values has been compared and the respective tokens written with token type data. The process is repeated for each screen image pixel until all the geometric shapes associated with an entire set of screen image pixels has been evaluated.

Figure 5:
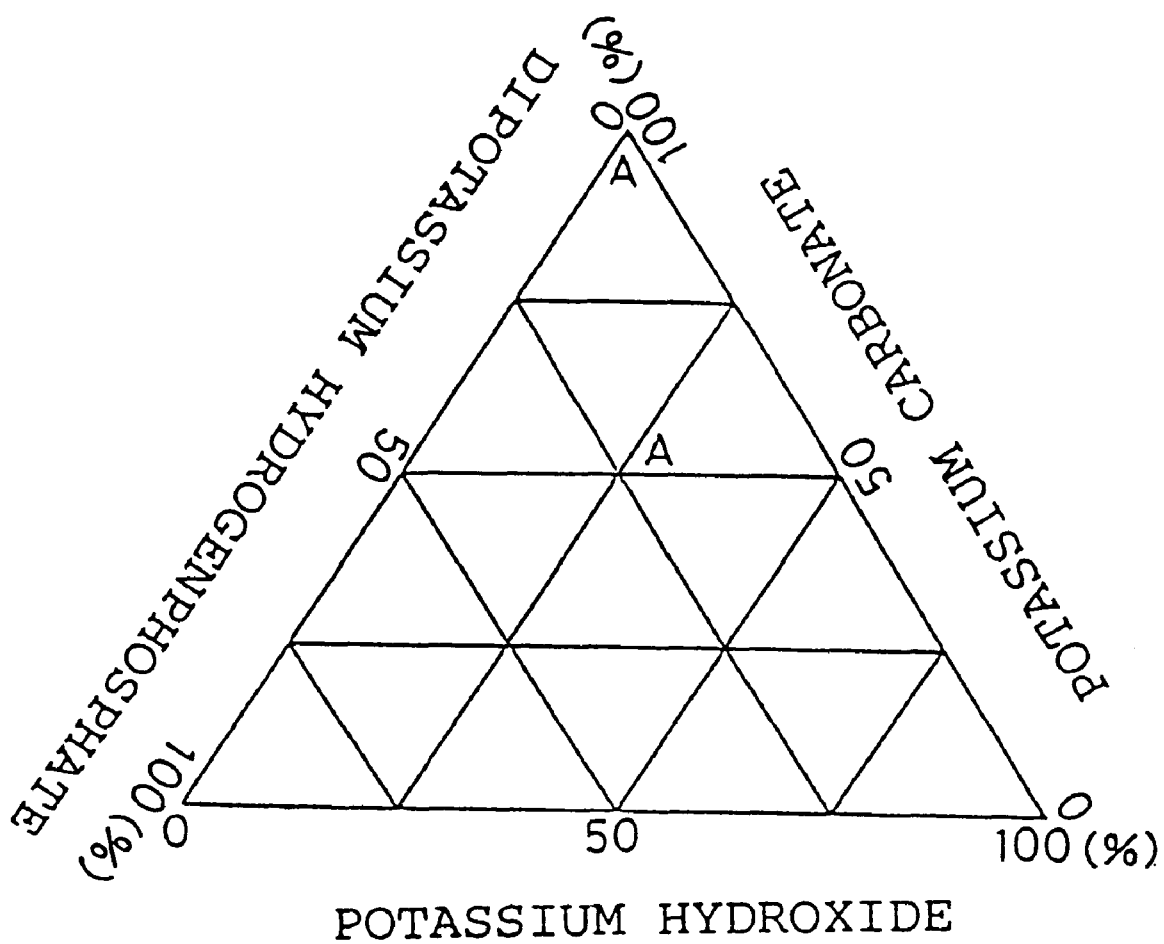
FIG. 5 is an example of a planar view of a pair of images in the x-z direction.
Figure 1:
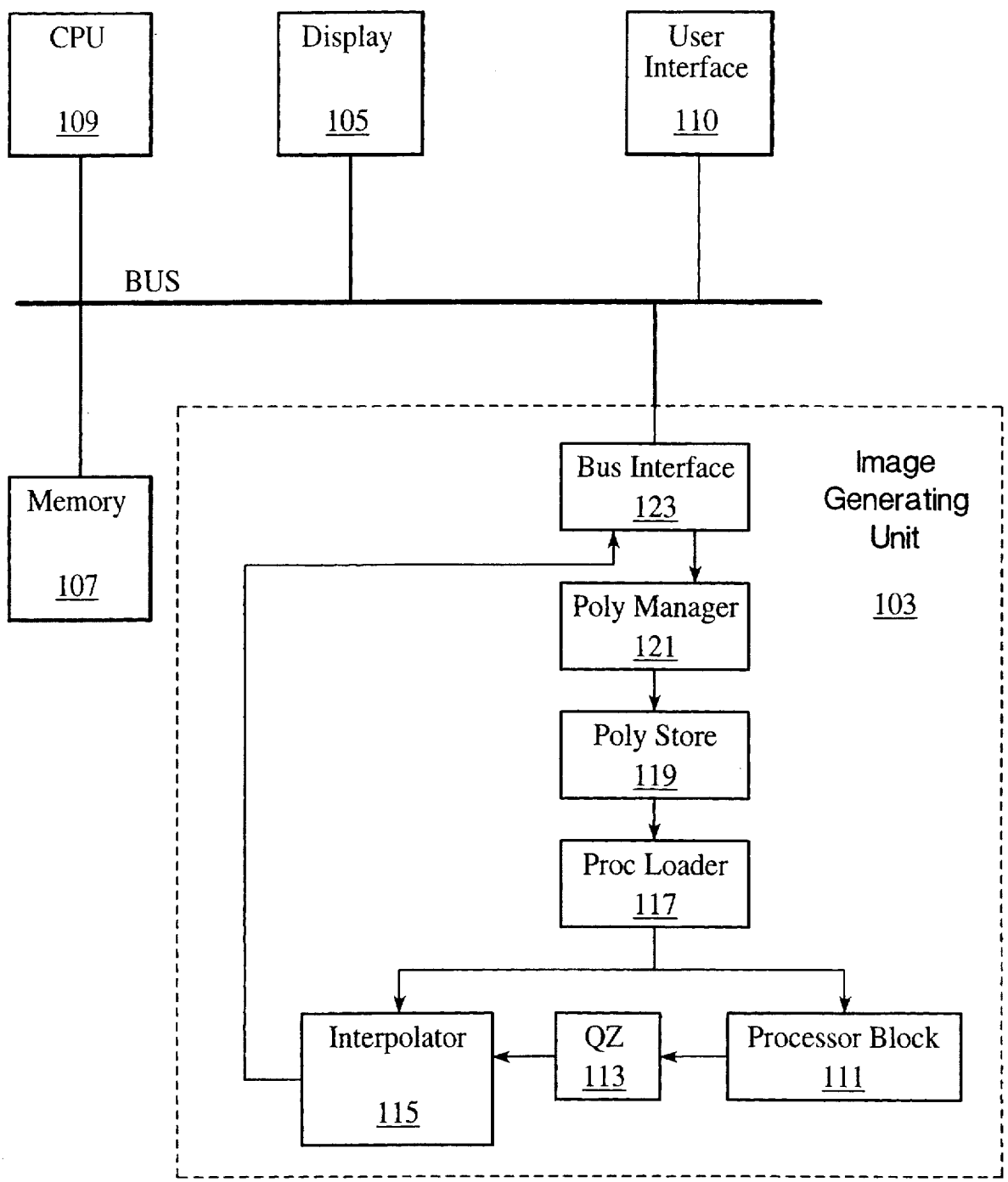
Figure 2:
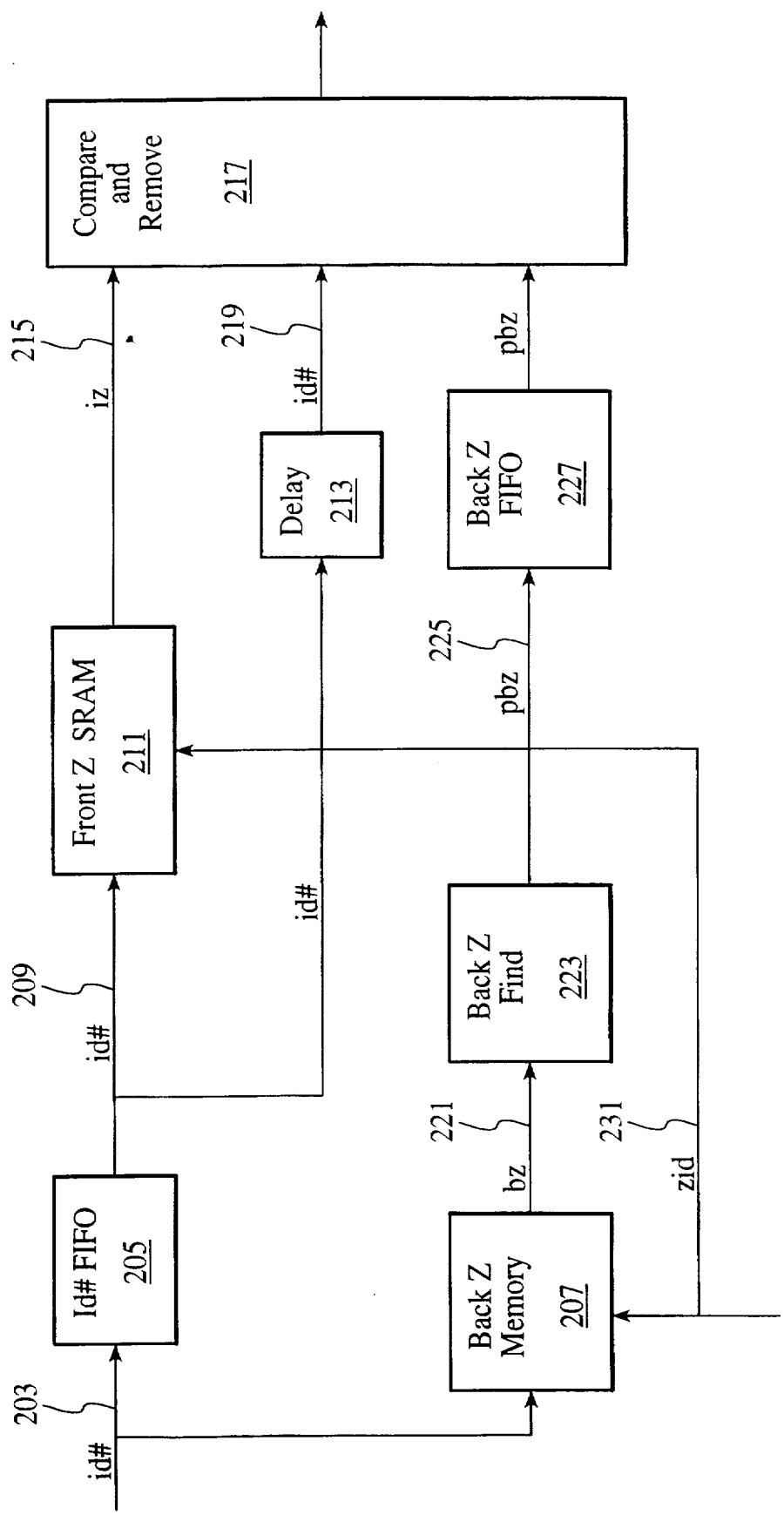
Figure 3:
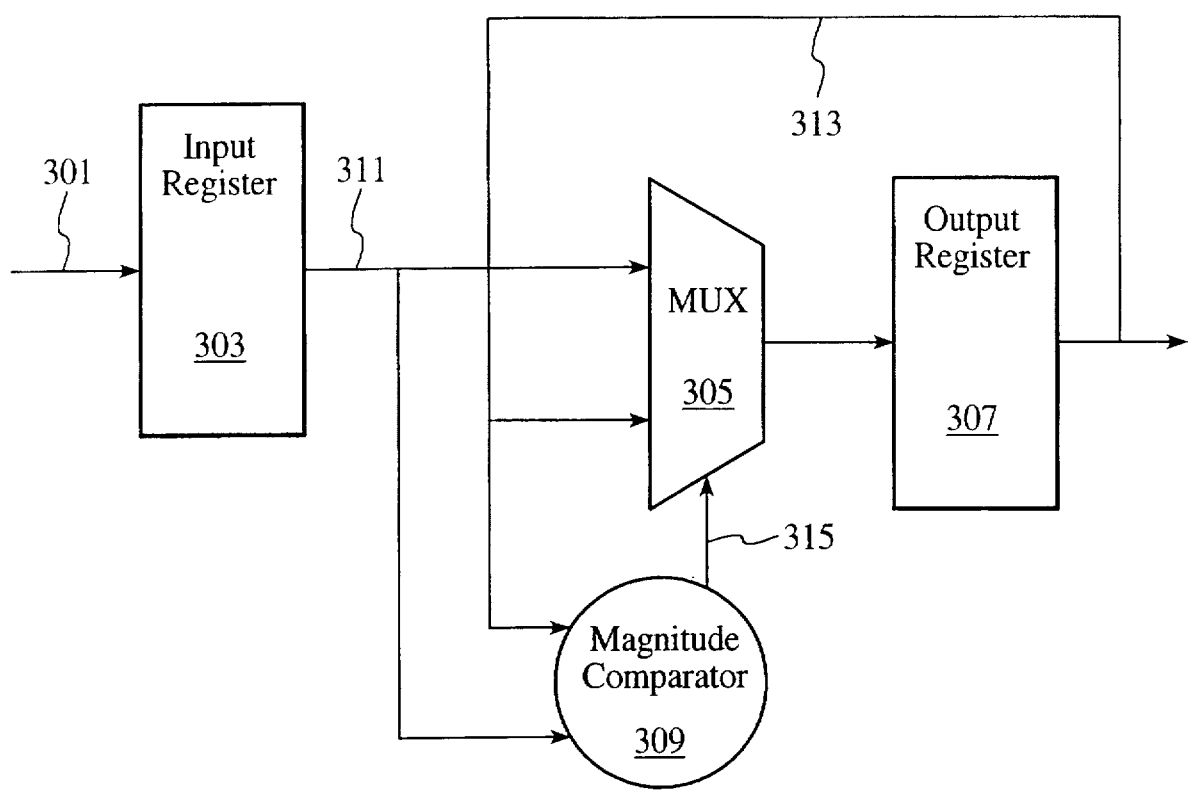
Figure 4:
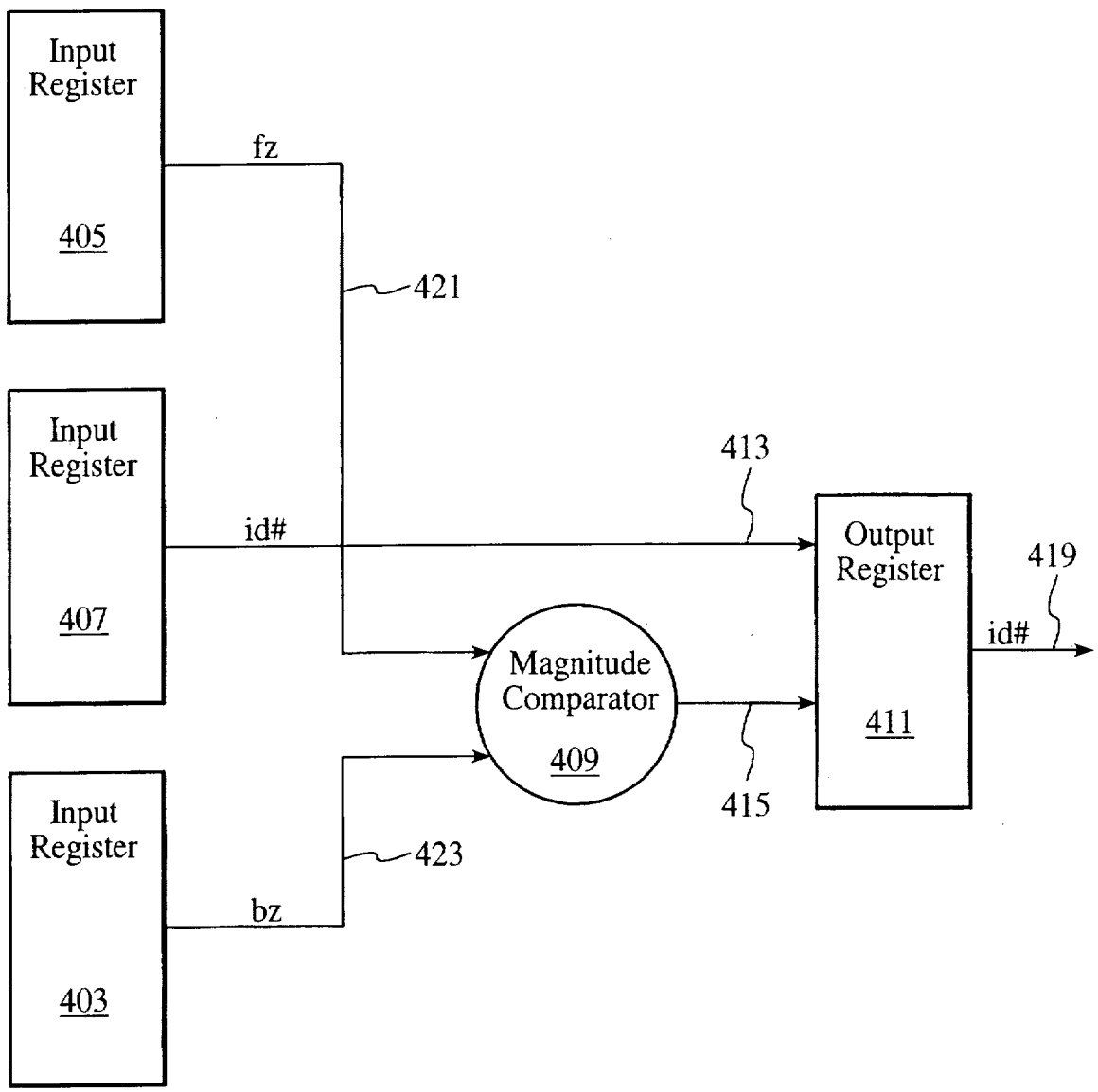
Figure 5:
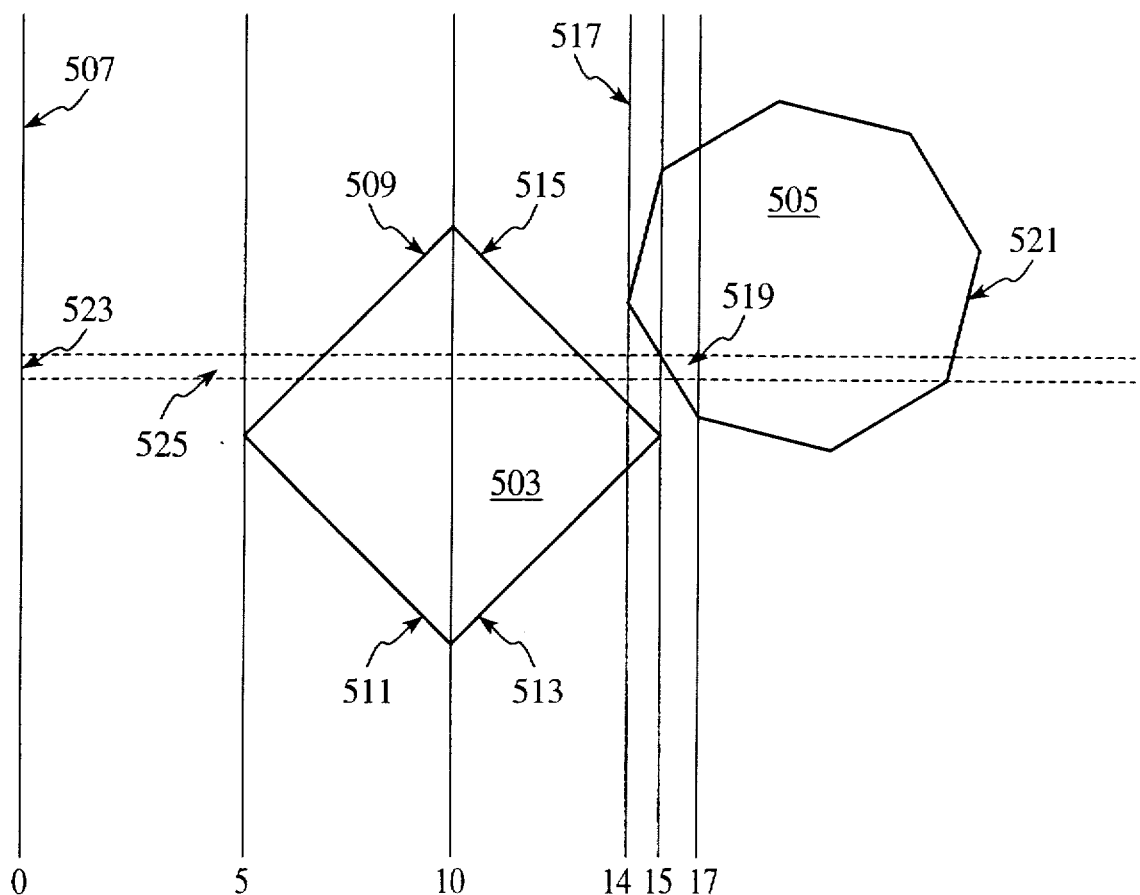

With reference to FIG. 5, an example of a pair of three-dimensional images 503, 505 stored within memory 107 are shown in the x-z plane with respect to x-y screen plane 507. Prior to transmission to identification/removal unit 201, images 503, 505 may be segmented into respective sets of geometric shapes 509–521 using graphics applications and stored in memory 107 for later processing or in temporary storage during identification processing. During identification processing, each screen pixel (x,y) is selected and geometric shapes intersecting the z-axis of the selected screen pixel (x,y) are identified in associated sets by sorter software. Each of geometric shapes 509, 515, 519, 521 intersect z-axis 525, which is the z-axis extending perpendicularly from screen pixel 523, and are identified as members of a set associated with screen pixel 523. Tokens identifying the polygon/pixel intersection are produced in an arbitrary order and written with token identifier logic circuitry by processor block 111 into identifier/removal unit 201. In the example, a set of tokens associated with screen pixel 523 may be produced in the following order: 515:valid, 505:valid, 519:valid, 509:lastvalid. The valid designation indicates that the geometric shape associated with the token intersects the z-axis of the associated screen pixel 523. The lastvalid designation indicates that this token is the last valid token in the ordered set.

During the identification processing, the front-z and back-z values are generated with search software by searching each of the geometric shapes containing elements within the (x,y) coordinates of display screen 105 for the nearest and furthest z-values. In the example, small z-values indicate that a three-dimensional object is close to display screen 105.

Front-z and back-z values for the example geometric shapes may be stored in memory 107 or temporary storage as follows:

TABLE 1

Front-z and back-z lookup values

| geometric shape | front-z | back-z |
|---|---|---|
| 509 | 5 | 10 |
| 511 | 5 | 10 |
| 513 | 10 | 15 |
| 515 | 10 | 15 |
| 517 | 14 | 15 |
| 519 | 14 | 17 |
| 521 | 20 | 23 |

By definition, the back z-value (back-z value) of each geometric shape is behind the z-value of the respective geometric shape at the intersection of the z-axis associated with screen pixel 523. For instance, the intersecting z-value for geometric shape 509 is 8 and the back-z value is 10 which is behind the intersecting z-value. Furthermore, the front z-value (front-z value) is in front of the z-value of the respective geometric shape at the intersection of the z-axis associated with screen pixel 523. For instance, the front-z value of geometric shape 509 is 5 which is in front of the intersecting z-value. Therefore, if the front-z value of a first geometric shape which is a member of an intersecting geometric shape set is behind the back-z value of a second geometric shape which is a member of the same intersecting geometric shape set then all the points along the surface of the first geometric shape are behind the second geometric shape. By definition, the first geometric shape would be obstructed from view by an observer located at the plane of display screen 105 and an exact z-value does not need to be calculated to remove the first geometric shape data from utilization in the construction of the two-dimensional screen image at screen pixel 523. For instance, geometric shape 521 has a front-z value of 20 which is behind the back-z value of geometric shape 519, therefore geometric shape 521 is obstructed from view at screen pixel 523 and may be discarded from utilization in the generation of screen pixel 523. Identification/removal unit 201 performs the comparison and removal operations for each intersecting geometric shape set for the respective screen pixels to eliminate data from utilization in the generation of screen image.

In the example and referring to FIG. 2, each of the tokens in the set associated with pixel 523 is transmitted serially to input buffer 205 and back-z memory 207. The back-z values are sequentially read from back-z memory 207 in the order received: 15 23 17 10 and transmitted to back-z find unit 223. Back-z find unit 223 identifies the frontmost back-z value from the set of intersecting geometric shapes as 10. During this processing, input buffer 205 holds the duplicate set of tokens. Once the frontmost back-z value for the set has been identified, back-z find unit 223 transmits the frontmost back-z value to compare and remove unit 201 through back-z buffer 227. At the same time, input buffer 205 transmits the token set to front-z memory 211 and delay unit 213 in the order received. Front-z memory 211 and delay unit 213 respectively transfer the front-z values and tokens in parallel, and in the order received, to compare and remove unit 217. Compare and remove unit 217 sequentially compares the frontmost back-z value of 10 to each of the front-z values: 10 20 14 5 of geometric shapes 515, 521, 519, 509. In the first comparison, the front-z value of geometric shape 515 is identified by compare/remove unit 217 as equal to the frontmost back-z value and therefore unobstructed. Compare/remove unit 217 then transmits the token associated with geometric shape 515 as valid to either memory 107 for future processing or temporary storage during two-dimensional screen image processing. Next, the front-z value of geometric shapes 521, 519 are sequentially identified by compare/remove unit 217 as greater than the frontmost back-z value and therefore obstructed. Compare/remove unit 217 then sequentially transmits the tokens associated with geometric shapes 521, 519 as invalid to either memory 107 for future processing or temporary storage during two-dimensional screen image processing, or simply discards the tokens. Next, the front-z value of geometric shape 509 is identified by compare/remove unit 217 as less than the frontmost back-z value and therefore unobstructed. Compare/remove unit 217 then transmits the token associated with geometric shape 515 as valid to either memory 107 for future processing or temporary storage during two-dimensional screen image processing. In the example, two valid tokens are output from identifier/removal unit 201 which would have to be compared to determine which of the two valid tokens is unobstructed at screen pixel 523.

Although the invention herein has been fully described, it may be appreciated by those skilled in the art that various of the structures described herein may be implemented either in hardware, software, or combinations thereof.

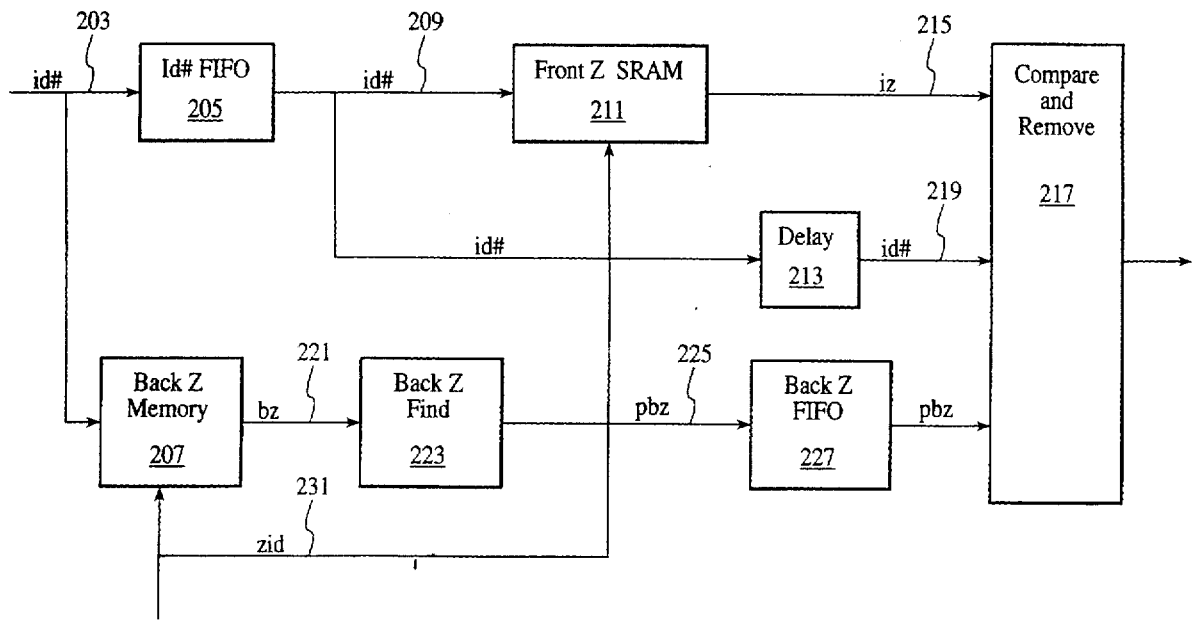

What is claimed is:

1. A system for generating a graphical display from data describing at least one three-dimensional object, the system comprising:

a processor block for determining if a current position intersects a portion of each of the at least one three-dimensional object, and providing an output if the current position intersects the portion;

an obstructed object identifier/removal unit coupled with the processor block, in response to the output and without determining a precise axial position of the portion, the obstructed object identifier/removal unit identifies if the portion is visually obstructed and removes data relating to the portion if the portion is obstructed; and at least one interpolator coupled with the obstructed object identifier/removal unit, the at least one interpolator for providing information relating to a plurality of characteristics of the portion if the portion is not obstructed and data relating to the portion is not removed;

wherein the current position is a current pixel to be displayed.

2. The system of claim 1 wherein the obstructed object identifier/removal unit utilizes a relational algorithm to determine if the portion is visually obstructed.

3. The system of claim 2 wherein the data further includes front-z data and back-z data for each of the at least one three-dimensional object and wherein the obstructed object identifier/removal unit further comprises:

a back-z unit for comparing the back-z data to determine a nearest back-z value; and a compare/removal unit coupled with the back-z unit for comparing the front-z data to the nearest back-z value, identifying the portion as being obstructed if a front-z value for the portion is farther than the nearest back-z value, and removing the data relating to the portion if the front-z value for the portion is farther than the nearest back-z value.

4. A method for generating a graphical display from data describing at least one three-dimensional object, the method comprising the steps of:

(a) determining if a current position intersects a portion of each of the at least one three-dimensional object;

(b) in response to the determination if the current position intersects the portion and without determining a precise axial position of the portion, identifying if the portion of the at least one three-dimensional object is visually obstructed and removing data relating to the portion if the portion is obstructed;

(c) providing information relating to a plurality of characteristics of the portion of the three-dimensional object if the portion is not obstructed and data relating to the portion is not removed; and (d) utilizing information relating to the portion to display an image of an unobstructed portion of the three-dimensional object;

wherein the current position is a current pixel to be displayed.

5. The method of claim 4 wherein the data includes geometric data and parameter data, the intersection determining step (a) further includes the step of:

(a) determining if a current position intersects the at least one three-dimensional object utilizing geometric data only.

6. The method of claim 5 wherein the data relating to the portion of each of the at least one object includes front-z data and back-z data; and wherein identifying and removing step (b) further includes the step of:

(b2) identifying the portion of the at least one three dimensional object as being obstructed if the front-z data is farther than a nearest back-z.

7. The method of claim 6 wherein information providing step (c) further includes the step of:

(c1) using parameter data to provide color and texture.

* * * * *

UNITED STATES PATENT AND TRADEMARK OFFICE
CERTIFICATE OF CORRECTION

PATENT NO. : 5,926,181
DATED : July 20, 1999
INVENTOR(S) : Michael C. Lewis et al It is certified that error appears in the above-identified patent and that said Letters Patent is hereby corrected as shown below:

The title page, showing the illustrative figure should be deleted to be replaced with the attached title page.

In the drawings, sheets 1-5, consisting of Figs. 1-5, should be deleted to be replaced with the corrected drawing Figs. 1-5, as shown on the attached pages.

Signed and Sealed this

Twenty-ninth Day of February, 2000

Attest:

Q. TODD DICKINSON

*Attesting Officer*     *Commissioner of Patents and Trademarks*

United States Patent [19]

Lewis et al.

[11] Patent Number: 5,926,181
[45] Date of Patent: Jul. 20, 1999

[54] METHOD AND APPARATUS FOR IDENTIFYING AND ELIMINATING THREE-DIMENSIONAL OBJECTS VISUALLY OBSTRUCTED FROM A PLANAR SURFACE

[75] Inventors: Michael C. Lewis, Redwood Estates; Stephen L. Morein, San Jose, both of Calif.

[73] Assignee: Stellar Semiconductor, Inc., San Jose, Calif.

[21] Appl. No.: 08/624,261

[22] Filed: Mar. 29, 1996

[51] Int. Cl.⁶ .................................................. G06T 15/40
[52] U.S. Cl. ................................. 345/421; 345/422
[58] Field of Search ................................ 395/121, 122, 395/123; 345/421, 422, 423

[56] References Cited

U.S. PATENT DOCUMENTS

| | | | |
|---|---|---|---|
| 4,945,500 | 7/1990 | Deering | 364/522 |
| 5,345,541 | 9/1994 | Kelley et al. | 395/126 |
| 5,509,110 | 4/1996 | Latham | 395/121 |
| 5,574,835 | 11/1996 | Duluk, Jr. et al. | 395/121 |
| 5,579,455 | 11/1996 | Greene et al. | 395/122 |
| 5,596,686 | 1/1997 | Duluk, Jr. et al. | 395/122 |

Primary Examiner—Mark K. Zimmerman
Attorney, Agent, or Firm—Sawyer & Associates

[57] ABSTRACT

A method and system for generating a graphical display from data describing at least one three-dimensional object is disclosed. The method and system include determining if a current position intersects a portion of the at least one three-dimensional object. The method and system further include identifying if the portion of the at least one three-dimensional object is visually obstructed and removing data relating to the portion of the at least one three-dimensional object if the portion is obstructed in response to the determination if the current position intersects the portion and without determining a precise axial position of the portion of the at least one three-dimensional object. The method and system also include providing information relating to a plurality of characteristics of the portion if the portion is not obstructed and data relating to the portion is not removed and utilizing information relating to the portion of the at least one three-dimensional object to display an image of an unobstructed portion of the three-dimensional object.

7 Claims, 5 Drawing Sheets